Aug. 25, 1936.　　　O. G. JERDE　　　2,051,994
HOT LUNCH OUTFIT
Filed July 28, 1933　　　2 Sheets-Sheet 1

INVENTOR
OTIS G. JERDE
BY Adam E. Fisher
ATTORNEY

Aug. 25, 1936.   O. G. JERDE   2,051,994
HOT LUNCH OUTFIT
Filed July 28, 1933   2 Sheets-Sheet 2

INVENTOR
OTIS G. JERDE
By Adam E. Fisher
ATTORNEY

Patented Aug. 25, 1936

2,051,994

UNITED STATES PATENT OFFICE 2,051,994

HOT LUNCH OUTFIT

Otis G. Jerde, Sisseton, S. Dak.

Application July 28, 1933, Serial No. 682,549

7 Claims. (Cl. 126—261)

My invention relates to lunch serving outfits or devices and the main object is to provide an assembly of elements by which school children, factory workers and the like may have hot lunches and in which each individual carries his own lunch box and at the proper time the desired edibles are all heated and made ready for serving.

Another object is to provide an assembly for this purpose including a steam receptacle and means for heating the same, jar shelves above the steam receptacle, an auxiliary box rack, a central egg boiling section in the steam receptacle, a plurality of lunch boxes including all utensils and condiments and uniform food containing jars. In the use of this assembly and in practicing the process therewith the students or workers prepare their lunch boxes at home and place suitable cooked foods in the jars and then when they enter the school or factory remove these jars place them on the shelves and place the boxes in the box rack. At some time then before the lunch hours as for instance at recess in the case of students, the jars are all placed in the steam receptacle and the heat applied thereto so that bytime for use the contents of the jars are heated for use. Eggs may be boiled in the central egg cooking section of the boiler.

A further object is to provide an assembly of this kind including an efficient and novel form of steam receptacle and burner assembly including a receptacle and perforated or reticulated rack adapted to receive and hold the jars and having handles for convenient removal, and a central compartment formed integrally with the receptacle with communicating apertures in its sides and adapted to segregate eggs or the like from the receptacle and a heater located directly beneath the egg compartment for efficient heating thereof.

With these and other objects in view the invention resides in the novel features as hereinafter set forth and claimed, reference being had to the accompanying drawings wherein:

Figure 1:
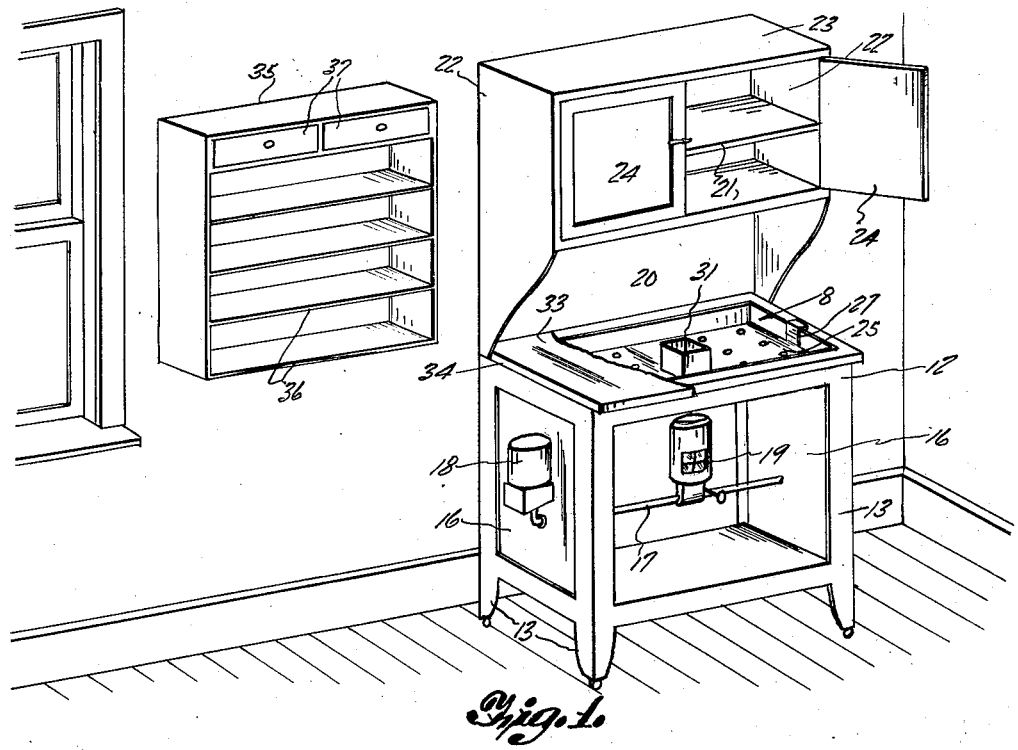
Figure 1 is a perspective view of my heater, boiler, jar shelves and box rack.
Figure 2:
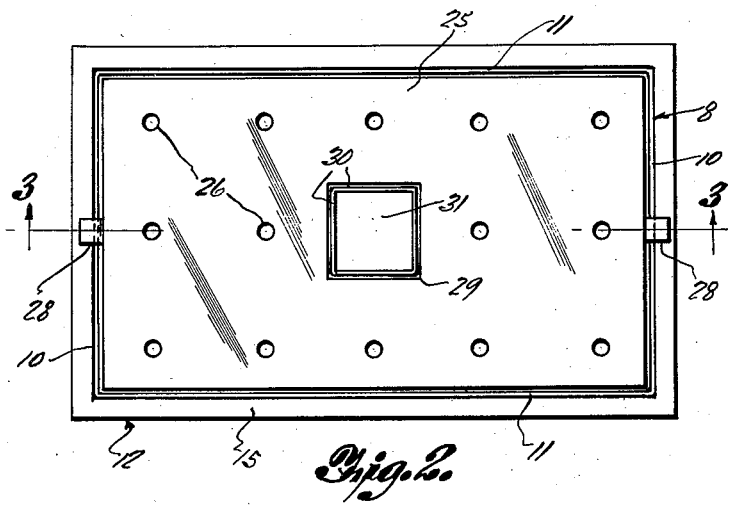
Figure 2 is an enlarged plan view of the receptacle and jar rack alone, the cover being removed.
Figure 3:
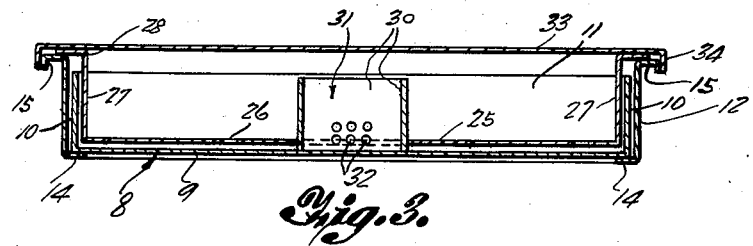
Figure 3 is a section along the line 3—3 in Figure 2, the cover being in place.
Figure 4:
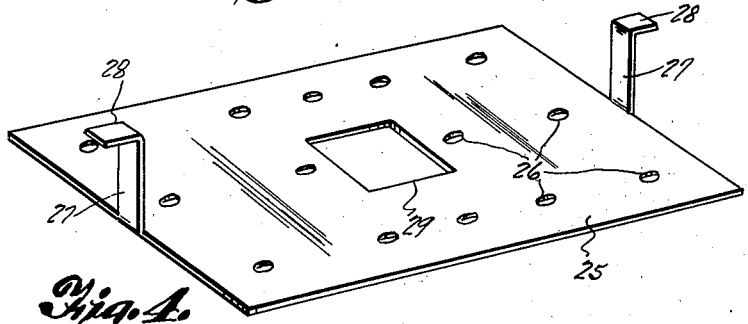
Figure 4 is a perspective view of the jar rack alone.
Figures 5, 6:
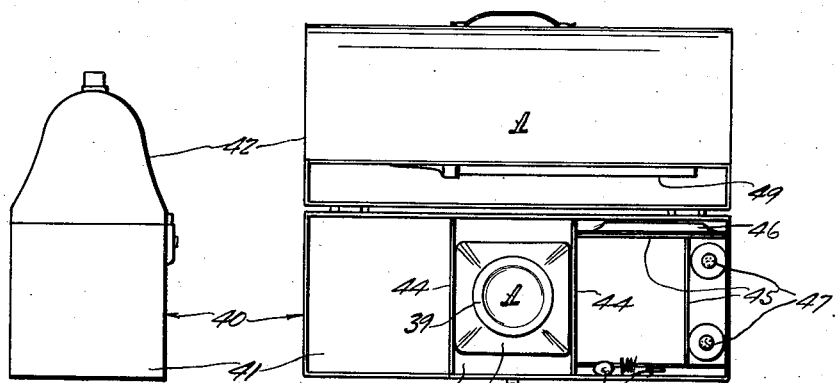
Figure 5 is an end view of a preferred form of lunch box as employed in my assembly.
Figure 6 is a plan view, opened, showing the interior and contents of the lunch box.
Figure 7:
Figure 7 is an elevation of one of the food jars used in my assembly.

Referring now with more particularity to the drawings the numeral 8 designates a shallow rectangular receptacle preferably of copper and including the bottom 9, ends 10 and sides 11. This receptacle is mounted in and supported by a frame 12 having legs 13 and an inturned marginal lip 14 on which the receptacle rests as shown in Figure 3, the upper margins of the frame being turned outwardly and downwardly as designated at 15. The legs 13 are joined at their ends by panels 16 through which a pipe 17 runs and leads from a fuel tank 18 at one end to carry the fuel to a conventional kerosene or gasoline burner 19 mounted on the pipe and disposed centrally beneath the boiler 8 in the frame. An upstanding back 20 is provided on the frame 12 and carries a pair of forwardly extended jar shelves 21 enclosed by ends 22 and a top 23 and provided with hinged doors 24.

A flat rectangular jar rack or carrier 25 is provided and made up of flat sheet material perforated as at 26 or, alternatively, made up of a frame covered with screen (not shown) and in either case of such shape as to slip freely down into the receptacle 8 where it is supported preferably a short distance clear of the bottom 9 thereof by upturned handles 27 at its ends and having outwardly turned ears or hooks 28 overlying and resting upon the margins 15 of the frame 12. At a central point this rack 25 has an opening 29 adapted to freely pass and clear the upstanding walls 30 of an egg boiler or compartment 31 defined by said walls which extend upward from the bottom 9 of the boiler 8 and are perforated as at 32 to permit the circulation of water therethrough.

A rectangular cover 33 is provided to cover the receptacle and its enclosed elements and this cover has a downwardly turned marginal lip 34 frictionally engaging the margin 15 of the frame 12 to hold it tightly in place. Both the receptacle 8 and rack 25 are removable from the frame 12 for emptying and cleaning and the rack may be readily removed even when hot without danger of burning the hands by means of the handles 27.

A box rack 35 is mounted on the wall A or otherwise supported adjacent the boiler and burner assembly and comprises a number of shelves 36 and napkin drawers 37 as shown.

Employed in connection with the elements so far described are a number of uniformly shaped and sized food jars one shown at 38 having a screw cap 39 and these jars may be carried in lunch boxes one shown at 40 and including the box section 41 and hinged top 42 of substantially conventional form except that medially of the section 41 a space 43 defined by cross bars 44 is provided to contain and frictionally hold one of the jars 38 and in one remaining end portion side and end racks or bars 45 are provided to receive and hold the plate 46, condiment shakers 47 and knife, fork and spoon 48. The usual thermos bottle 49 is carried in the top 42. Both the lunch box and jar may have identifying numerals or indicia as shown.

In the use of the several elements described in the preparation and serving of the lunches the students or workers fill the jars 38 with any desired prepared or cooked foods at home such as meats, potatoes, soup or the like and on reaching the school or factory remove the jars from the lunch boxes 40, place the jars on the jar shelves 21 and the boxes on the box rack shelves 36. Then some time before lunch, as for instance during school recess or intermission, the teacher or some one duly appointed places the jars in the receptacle 8 on the rack 25 and lights the burner 19 so that by lunch time the water in the receptacle has heated the contents of the jars into a warm savory condition for eating. Anyone bringing eggs to boil may place them within the walls 31 where they are cooked and protected from the jars in the remainder of the boiler. The rack being supported clear of the boiler bottom prevents jars from being broken by contact therewith.

In regard to the latter operation of boiling eggs attention is called to the fact that both the egg compartment 31 and burner 19 being centrally located the compartment is directly over the burner and so exposed to the full flow of heat therefrom. This causes the water in the compartment to be heated rapidly to a high temperature where it is needed while the water in the surrounding portions of the boiler and around the jars is at a relatively lower temperature as desirable for proper heating of the food.

The operation of serving the lunches is carried out in convenient and orderly manner and with a minimum of work required both in the initial preparation of the lunch at home and the serving at the school or factory. The advantages of a nutritious warm lunch such as thus made possible are too well known to need enumeration herein and in actual service the process has been found completely practical. Of course the size and number of elements used may be varied as necessary.

While I have herein set forth a certain preferred embodiment of my invention it is understood that I may vary from the same in minor details not departing from the spirit of the invention and within the scope of the appended claims.

I claim:

1. In a device of the kind described, a leg supported frame, a receptacle containing water for warming jars immersed therein, said receptacle being removably mounted in the frame, a relatively smaller egg boiling compartment located centrally in the receptacle and comprising upstanding perforated side walls, exteriorly contacted by the water in said receptacle, a burner mounted in the frame for concentrating its heat against the bottom of the egg boiling compartment, a flat, perforated jar rack removably mounted in the receptacle and having a central opening to clear the said walls of the egg boiling compartment.

2. In a device of the kind described, a frame, a receptacle containing water for warming jars immersed therein, said receptacle being supported by said frame, an egg boiling compartment in the receptacle, a jar rack removably applicable to said receptacle, said rack having an opening therein permitting the rack to clear the egg boiling compartment, means for lowering the rack into the receptacle and for lifting the same therefrom, and a burner for the receptacle located directly beneath the egg boiling compartment for concentrating its heat thereagainst and creating and maintaining a relatively higher degree of temperature in the water in said compartment than in the water in the receptacle proper.

3. In a device of the kind described, a frame, a receptacle containing water for warming jars immersed therein, said receptacle being supported by said frame and having an egg boiling compartment therein, a jar rack removably applicable to said receptacle, said rack having an opening therein permitting the rack to clear said egg boiling compartment, hangers for the jar rack cooperating with the frame to suspend said rack within the water in the receptacle, and a burner beneath the receptacle concentrating its heat against the bottom of said egg boiling compartment.

4. In a device of the kind described, a frame, a receptacle mounted on the frame and adapted to contain water for warming jars immersed therein, an egg boiling compartment within the receptacle consisting of a portion of the bottom of said receptacle together with upstanding walls meeting said bottom at their lower edges, a jar rack removably disposed in the water within the receptacle in a position overlying another portion of said bottom, means for lowering the rack into the receptacle and for lifting the same therefrom, and a burner supported by the frame and located directly beneath said first portion of said bottom for concentrating its heat thereagainst and creating and maintaining a relatively higher degree of temperature in the water in said compartment than in the water in the receptacle proper.

5. In a device of the kind described, a frame, a receptacle mounted on the frame and adapted to contain water for warming jars immersed therein, an egg boiling compartment within the receptacle immovably associated therewith, a jar rack removably applicable to said receptacle and having an opening therein permitting said rack to clear the egg boiling compartment as it is lowered into and lifted from the receptacle, and a burner supported by said frame and disposed directly beneath the egg boiling compartment for concentrating its heat at the locality of said compartment to create and maintain a relatively higher degree of temperature in the water in said compartment than in the water in the receptacle proper.

6. In a device of the kind described, a frame, a receptacle mounted on the frame and adapted to contain water for warming jars immersed therein, an egg boiling compartment within the receptacle and occupying a portion of the bottom thereof, a jar rack removably disposed in the water within the receptacle in a position overlying another portion of said bottom, and a burner supported by the frame and located directly beneath said first portion of said bottom for concentrating its heat thereagainst and creating and maintaining a relatively higher degree of temperature in the water in said compartment than in the water in the receptacle proper.

7. In a device of the kind described, a leg supported frame, a rectangular receptacle removably mounted in the frame, a relatively smaller egg boiling compartment located centrally in the receptacle and comprising upstanding perforated side walls, a burner mounted in the frame directly beneath the egg boiling compartment, a rectangular flat perforated jar rack removably mounted in the receptacle and having a central opening to clear the said walls of the egg boiling compartment, handles turned upward from the margins of the jar rack, and outwardly turned ears on the upper end of the handles adapted to rest on the margins of the frame and support the rack clear of the receptacle bottom.

OTIS G. JERDE.